(12) United States Patent
Wase et al.

(10) Patent No.: US 12,374,071 B2
(45) Date of Patent: Jul. 29, 2025

(54) EYE TRACKING SYSTEM

(71) Applicant: Tobii AB, Danderyd (SE)

(72) Inventors: Viktor Wase, Danderyd (SE); Erik Ljungzell, Danderyd (SE); Mark Ryan, Danderyd (SE); Chiara Giordano, Danderyd (SE); Rickard Lundahl, Danderyd (SE); Pravin Kumar Rana, Danderyd (SE)

(73) Assignee: Tobii AB, Danderyd (SE)

( * ) Notice: Subject to any disclaimer, the term of this patent is extended or adjusted under 35 U.S.C. 154(b) by 683 days.

(21) Appl. No.: 17/459,442

(22) Filed: Aug. 27, 2021

(65) Prior Publication Data

US 2022/0083799 A1 Mar. 17, 2022

(30) Foreign Application Priority Data

Aug. 27, 2020 (SE) .................................... 2030271-7

(51) Int. Cl.
*G06K 9/00* (2022.01)
*G06T 7/70* (2017.01)
(Continued)

(52) U.S. Cl.
CPC .............. *G06V 10/141* (2022.01); *G06T 7/70* (2017.01); *G06V 10/22* (2022.01); *G06V 10/25* (2022.01); *G06V 40/19* (2022.01)

(58) Field of Classification Search
CPC ...... G06V 10/141; G06V 10/22; G06V 10/25; G06V 40/19; G06V 40/18; G06T 7/70; G06T 7/00; G06T 7/246; G06T 19/006; G02B 27/017; G02B 27/0093; G02B 27/0179; G02B 2027/014;
(Continued)

(56) References Cited

U.S. PATENT DOCUMENTS

| 10,342,425 B1 * | 7/2019 | Rana ...................... A61B 3/113 |
| 2015/0193920 A1 | 7/2015 | Knee et al. |

(Continued)

FOREIGN PATENT DOCUMENTS

| CN | 103530618 A | 1/2014 |
| CN | 107123118 A | 9/2017 |

(Continued)

OTHER PUBLICATIONS

EP21193430.2, "Extended European Search Report", Mar. 10, 2022, 12 pages.
(Continued)

*Primary Examiner* — Duy M Dang
(74) *Attorney, Agent, or Firm* — Christopher Ignatius Moylan

(57) ABSTRACT

An eye tracking system is provided that detects the presence of problematic blobs in an image captured by the system and removes these problematic blobs by switching off illuminators. Problematic blobs may be those obscuring the pupil of the eye of the user. Each blob is detected in a first image by the use of at least one first criterion, and then an illuminator is switched off. After the illuminator is switched off, at least one second criterion is used to identify blobs in a subsequent image. This process may be repeated until the illuminator causing the problematic blob is identified.

17 Claims, 7 Drawing Sheets

(51) Int. Cl.
*G06V 10/141* (2022.01)
*G06V 10/22* (2022.01)
*G06V 10/25* (2022.01)
*G06V 40/19* (2022.01)

(58) Field of Classification Search
CPC .... G02B 2027/0178; G02B 2027/0187; G02B 27/01; G02B 2027/0134; G02B 2027/0138; G02B 2027/125; G06F 3/013
See application file for complete search history.

(56) References Cited

U.S. PATENT DOCUMENTS

| | | | |
|---|---|---|---|
| 2016/0004303 A1* | 1/2016 | Arar | G06F 3/013 345/156 |
| 2019/0138094 A1 | 5/2019 | Miettinen et al. | |
| 2019/0208119 A1 | 7/2019 | Ekstrand et al. | |
| 2020/0187774 A1 | 6/2020 | Rana et al. | |

FOREIGN PATENT DOCUMENTS

| | | | |
|---|---|---|---|
| CN | 105678286 A | 6/2019 | |
| CN | 111611845 A | 9/2020 | |
| EP | 3079560 A1 | 10/2016 | |
| JP | 2013244363 A | 12/2013 | |
| WO | WO-2019050543 A1 * | 3/2019 | ............. A61B 3/113 |
| WO | 2019185136 A1 | 10/2019 | |

OTHER PUBLICATIONS

SE2030271-7, "Search Report", May 10, 2021, 2 pages.
Chinese Search Report for Application No. 202110979139.5, completed on Feb. 26, 2024.

* cited by examiner

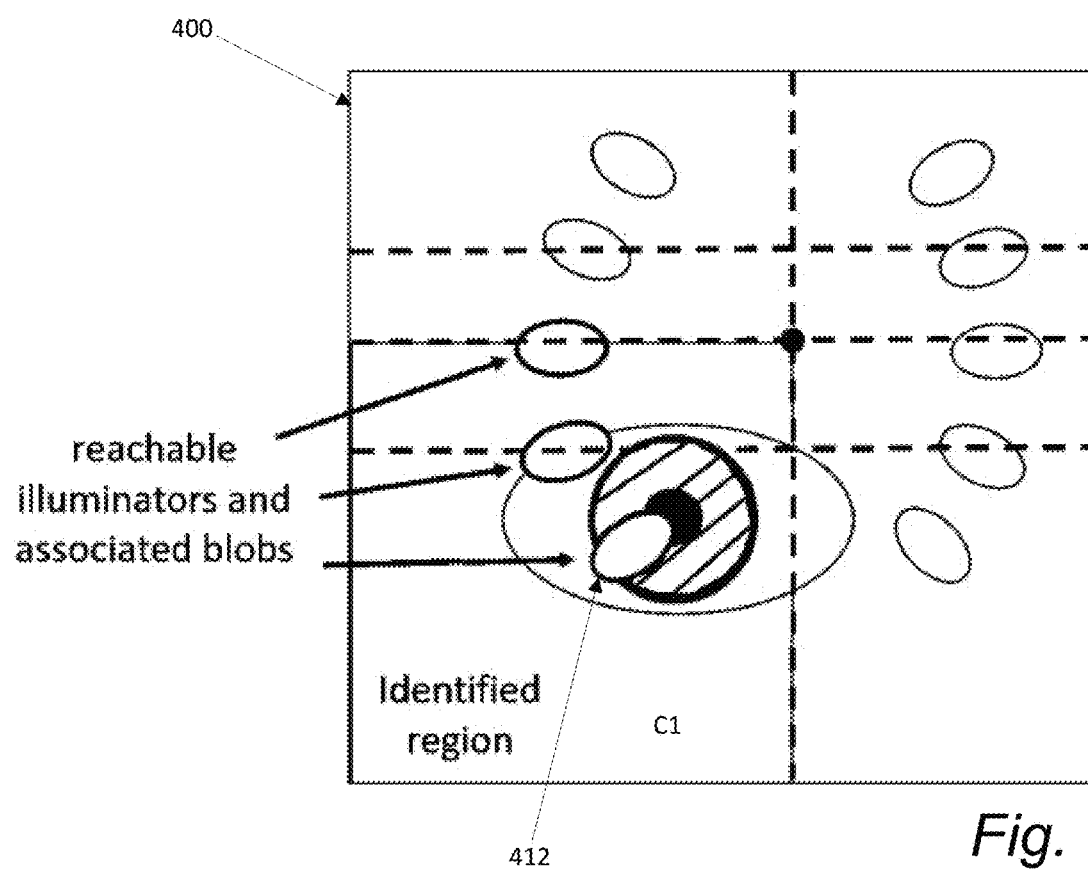
Fig. 8
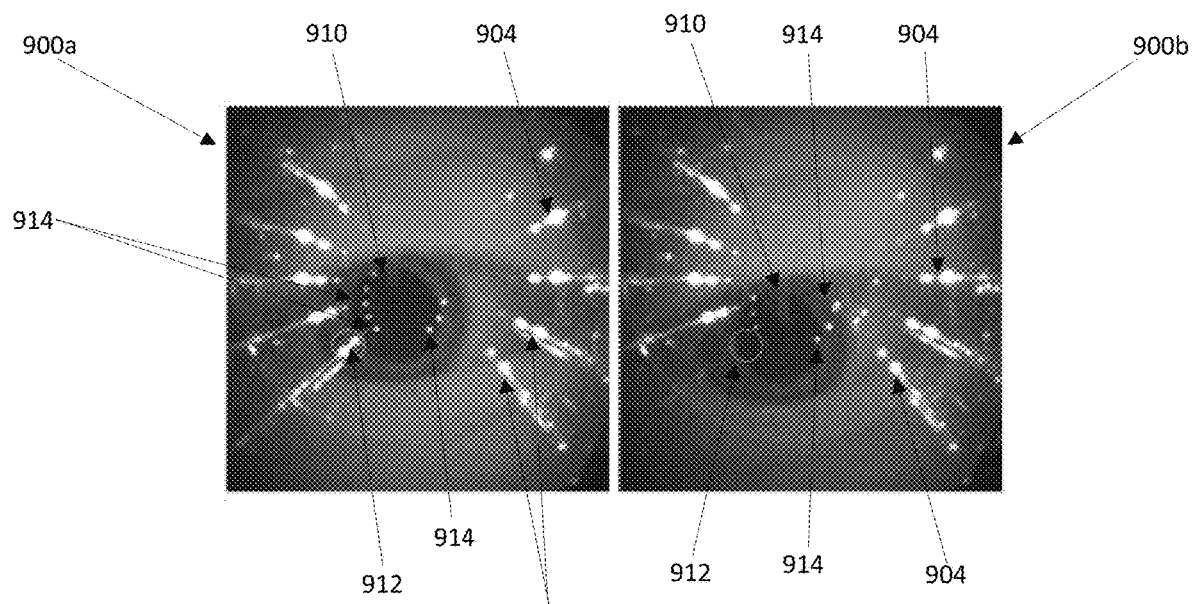
Fig. 9a
Fig. 9b

EYE TRACKING SYSTEM

CROSS-REFERENCES TO RELATED APPLICATIONS

This application claims priority to Swedish Application No. 2030271-7, filed Aug. 27, 2020; the content of which are hereby incorporated by reference.

TECHNICAL FIELD

The present disclosure generally relates to the field of eye tracking. In particular, the present disclosure relates to systems and methods for use in controlling illuminators in an eye tracking system.

BACKGROUND ART

In eye tracking applications, digital images are retrieved of the eyes of a user and the digital images are analysed in order to estimate the gaze direction of the user. There are different methods for achieving such an estimation. In some methods, ambient light is used when retrieving images of the eyes of the user and, in some methods, additional light sources (illuminators) are used to illuminate the eyes for retrieving images of the eyes of the user. Generally, the estimation of the gaze is based on identification of the pupils of the eyes of the user together with identification of glints (corneal reflections) in the eyes of the user. In some systems, for example where a model-based algorithm is used, in order to identify a pupil of an eye in an image of the eye, the contrast between a representation of the pupil and a representation of an iris of the eye in the image must be sufficient. In other systems, deep machine learning and neural networks may be used, but such systems tend to be too computationally heavy for real-time execution on embedded hardware.

One known method of eye tracking includes the use of infrared light and an image sensor. The infrared light is directed towards the eye of a user and the reflection of the light is captured by an image sensor. Through analysis of the reflection point, the direction of the user's gaze may be calculated. One such system is described in U.S. Pat. No. 7,572,008 (which is hereby incorporated by reference in its entirety).

Portable or wearable eye tracking devices have also been previously described. One such eye tracking system is described in U.S. Pat. No. 9,041,787 (which is hereby incorporated by reference in its entirety). A wearable eye tracking device is described using illuminators and image sensors for determining gaze direction.

In applications of eye tracking for portable or wearable eye tracking devices, such as in virtual reality (VR) devices, where head mounted devices are used which include an eye tracking system determining an eye direction and/or gaze direction based on a pupil centre and glints from illuminators illuminating a user's eyes, problems can arise for example for a user who is wearing a pair of spectacles under the VR glasses. For example, one or more reflections from an optic arrangement of the pair of spectacles caused by the one or more of the illuminators may result in a situation where the pupil cannot be accurately identified or where no or too few glints can be identified for eye tracking. In such situations it will be difficult or impossible to determine eye direction and/or gaze direction and or eye direction or at least not with desirable reliability.

U.S. Pat. No. 10,342,425 B1 discloses a method for controlling illuminators in order to limit the influence of unwanted reflections—or "blobs"—on an eye tracking system. The method operates by detecting blobs that meet one or more predefined criteria in an image received by an eye tracking system, identifying an illuminator associated with the blobs, and switching off the identified illuminator.

It would be desirable to provide an eye tracking technology to account for such situations where reflections from glasses worn under a VR headset reduce the accuracy of eye tracking or makes it difficult or impossible to determine eye direction and/or gaze direction for eye tracking. It may also be plausible for unwanted reflections to be caused by other optical assemblies found within or externally to a VR headset.

STATEMENTS OF INVENTION

According to a first aspect, there is provided an eye tracking system comprising:
  a plurality of illuminators for illuminating an eye of a user;
  a receiver for receiving a first image of the eye of the user from an image sensor, the first image resulting from the image sensor detecting light from the plurality of illuminators reflected from the eye of the user and reflected from an optic arrangement located between the plurality of illuminators and the eye of the user; and
  processing circuitry configured to carry out the steps of:
    determining a pupil position of a representation of the eye in the first image;
    searching for and identifying at least one blob in the first image, wherein the or each blob is a representation of a reflection from the optic arrangement of light from a respective illuminator of the plurality of illuminators, wherein at least one first criterion must be met for the or each blob;
    selecting a blob of the at least one blob as an active blob;
    identifying an active illuminator of the plurality of illuminators, wherein the active illuminator is the illuminator of the plurality of illuminators that is responsible for the active blob, and switching off the active illuminator;
  wherein identifying the active illuminator comprises:
    (a) switching off one of the plurality of illuminators;
    (b) searching for at least one blob in a subsequent image received from the image sensor, wherein at least one second criterion must be met for the or each blob, the at least one second criterion being different from the at least one first criterion;
    (c) determining if the active blob is present in the subsequent image and, if the active blob is not present, determining that the active blob was a reflection from the illuminator that was switched off;
    (d) on a condition that the active blob is present in the subsequent image, repeating steps (a) to (c) for other illuminators of the plurality of illuminators.

The eye tracking system therefore operates using different criteria for the initial identification of a blob and the confirmation that it has been removed by the switching off of an illuminator.

By doing so, the system can operate with a lower chance of false correlations between illuminators and blobs, making the tracking and removal of blobs more effective.

The plurality of illuminators may be arranged at fixed positions relative to each other and the eye tracking system.

The plurality of illuminators may be in a fixed or substantially fixed position relative to the eye or eyes of the user. This means that the position of the illumination from each illuminator should be reasonably predictable. However, due to slippage of a headset incorporating such a system, or an imperfect fit, there may be some limited movement of the illuminators of the system relative to the eye of the user.

The at least one first criterion may include a blob mass higher than a first predetermined threshold and the at least one second criterion may include a blob mass higher than a second predetermined threshold that is lower than the first predetermined threshold.

Blob mass may be defined as the sum of pixel intensities of all of the pixels belonging to the blob, i.e. the sum of the intensities of all of the connected components constituting the blob.

Using two different thresholds of blob mass take into account that the total blob mass of all blobs is likely to be lower after the switching off of an illuminator, and therefore by changing the threshold to a lower threshold, the chance of false correlations between illuminators and blobs can be lowered.

The blob mass is lower after the switching off of an illuminator due to the fact that the overall illumination provided by the plurality of illuminators is now of a lower value, e.g. when one of ten illuminators is switched off the overall luminance may drop by around 10%. The image as a whole may therefore be darker. Blobs that were previously slightly above the blob mass threshold may therefore drop below the threshold for detection simply due to the decrease in overall image brightness rather than removal of a blob. The invention seeks to prevent such false negatives.

The processing circuitry may be further configured to, after selecting a blob as the active blob, carry out the steps of:
identifying a region of a plurality of regions that contains the active blob, wherein each region is associated with a subset of the plurality of illuminators; and wherein steps (a) to (c) are executed on illuminators in the subset of illuminators associated with the identified region.

Each region may overlap with one or more other regions, such as those directly adjacent to the said region.

A centre of the regions may correspond to the lens centre, i.e. the optical centre of the lens in the system through which the user looks. The illuminators may preferably be arranged around the lens centre such that the lens centre corresponds to the positional centre of the illuminators. The centre of the regions therefore may not correspond to the centre of the image, as the eye and/or blobs may not be centralised in the image. Whilst centrality of the eye in the image may be preferred, this may not be possible due to hardware calibration limitations or errors, or slippage or non-optimal positioning By separating the image into regions, it can be ensured that the switching off of illuminators is limited to those that are most likely to result in the active blob at any point. Thus, processing time and power requirements are limited.

The regions may be predetermined and stored in memory. For example, the regions may be predetermined based on the arrangement of the illuminators within the system and/or their position in relation to the image sensor. Alternatively, the regions may be computed by the processor as a part of the computation.

The processing circuitry may be further configured to determine a region of interest (ROI) around the pupil position, wherein the step of searching for at least one blob is executed in the region of interest.

Limiting the search for the blob to the region of interest lowers the amount of the image that is required to be processed, decreasing processing time and power requirements.

The at least one first criterion and the at least one second criterion may be dependent on a measured characteristic of the image. The criteria may therefore be reactive to changing conditions in which the image is taken, such as luminance, intensity etc.

The measured characteristic may be the maximum pixel intensity of the image.

The first predetermined threshold and second predetermined threshold may be relative thresholds. By being relative thresholds, they may be reactive to the changing characteristics of the image and conditions in which the image was taken, whilst retaining the ability to correctly identify blobs.

The first predetermined threshold and second predetermined threshold may be relative to a maximum pixel intensity of the image or a portion of the image. The portion of the image may be the ROI.

The active blob selected may be the blob closest to the pupil position. The active blob is therefore the one most likely to be detrimental to the eye tracking abilities of the eye tracking system.

The processing circuitry may be further configured to carry out the step of:
detecting when the pupil has subsequently moved away from the position of the active blob and switching back on the switched off illuminator.

The system may therefore reactivate the switched off illuminator when it is determined that a blob from that illuminator is unlikely to be detrimental to the eye tracking abilities of the eye tracking system.

The processing circuitry may be further configured to turn on all illuminators and reset which illuminators in a region have been checked if one or more of the following events occurs:
the pupil is not detected in the image;
no blobs are detected in the image;
an additional blob within a first predetermined distance to the active blob is found in a subsequent image, indicating that an incorrect correlation between an illuminator and the active blob has been made;
an additional blob within a second predetermined distance to the pupil is found, the additional blob being closer to the pupil than the active blob; or
the eye tracking system is removed from the head of the user.

Such a feature may prevent any unnecessary processing of the image when such events occur, highlighting when an error may have been made by the system and allowing the system to start the processing from the beginning.

According to a second aspect, there is provided a method of controlling illuminators in an eye tracking system, wherein the system includes a plurality of illuminators, the method comprising:
receiving a first image of the eye of the user from an image sensor, the first image resulting from the image sensor detecting light from the plurality of illuminators reflected from the eye of the user and reflected from an optic arrangement located between the plurality of illuminators and the eye of the user;
determining a pupil position of a representation of the eye in the first image;

searching for and identifying at least one blob in the first image, wherein the or each blob is a representation of a reflection from the optic arrangement of light from a respective illuminator of the plurality of illuminators, wherein at least one first criterion must be met for the or each blob;

selecting a blob of the at least one blob as an active blob;

identifying an active illuminator of the plurality of illuminators, wherein the active illuminator is the illuminator of the plurality of illuminators that is responsible for the active blob, and switching off the active illuminator;

wherein identifying the active illuminator comprises:
(a) switching off one of the plurality of illuminators;
(b) searching for at least one blob in a subsequent image received from the image sensor, wherein at least one second criterion must be met for the or each blob, the at least one second criterion being different from the at least one first criterion;
(c) determining if the active blob is present in the subsequent image and, if the active blob is not present, determining that the active blob was a reflection from the illuminator that was switched off;
(d) on a condition that the active blob is present in the subsequent image, repeating steps (a) to (c) for other illuminators of the plurality of illuminators.

The plurality of illuminators may be arranged at fixed positions relative to each other and the eye tracking system.

The plurality of illuminators may be in a fixed or substantially fixed position relative to the eye or eyes of the user.

The at least one first criterion may include a blob mass higher than a first predetermined threshold and the at least one second criterion may include a blob mass higher than a second predetermined threshold that is lower than the first predetermined threshold.

The method may further comprise the steps of, after selecting a blob as the active blob:
identifying a region of a plurality of regions that contains the active blob, wherein each region is associated with a subset of the plurality of illuminators; and wherein steps (a) to (c) are executed on illuminators in the subset of illuminators associated with the identified region.

Each region may overlap with one or more other regions, such as those directly adjacent to the said region.

The regions may be predetermined and stored in memory. For example, the regions may be predetermined based on the arrangement of the illuminators within the system and/or their position in relation to the image sensor. Alternatively, the regions may be computed by the processor as a part of the computation.

The method may further comprise the step of determining a region of interest around the pupil position, wherein the step of searching for at least one blob is executed in the region of interest.

The at least one first criterion and the at least one second criterion may be dependent on a measured characteristic of the image.

The measured characteristic may be the maximum pixel intensity of the image.

The first predetermined threshold and second predetermined threshold may be relative thresholds.

The first predetermined threshold and second predetermined threshold may be relative to a maximum pixel intensity of the image or a portion of the image. The portion of the image may be the ROI.

The active blob selected may be the blob closest to the pupil position.

The method may further comprise the step of:
detecting when the pupil has subsequently moved away from the position of the active blob and switching back on the switched off illuminator.

The method may further comprise the step of turning on all illuminators and resetting which illuminators in a region have been checked if one or more of the following events occurs:
the pupil is not detected in the image;
no blobs are detected in the image;
an additional blob within a first predetermined distance to the active blob is found in a subsequent image, indicating that an incorrect correlation between an illuminator and the active blob has been made;
an additional blob within a second predetermined distance to the pupil is found, the additional blob being closer to the pupil than the active blob; or
the eye tracking system is removed from the head of the user.

According to a third aspect, there is provided a head mounted device comprising an eye tracking system according to the first aspect.

The head mounted device may be a virtual reality headset, an augmented reality headset, a mixed-reality headset, or an eye tracking headset.

According to a fourth aspect, there is provided a computer program having instructions that when executed by a processor, cause the processor to perform a method of controlling illuminators in an eye tracking system, wherein the system includes a plurality of illuminators, the method comprising:
receiving a first image of the eye of the user from an image sensor, the first image resulting from the image sensor detecting light from the plurality of illuminators reflected from the eye of the user and reflected from an optic arrangement located between the plurality of illuminators and the eye of the user;
determining a pupil position of a representation of the eye in the first image;
searching for and identifying at least one blob in the first image, wherein the or each blob is a representation of a reflection from the optic arrangement of light from a respective illuminator of the plurality of illuminators, wherein at least one first criterion must be met for the or each blob;
selecting a blob of the at least one blob as an active blob;
identifying an active illuminator of the plurality of illuminators, wherein the active illuminator is the illuminator of the plurality of illuminators that is responsible for the active blob, and switching off the active illuminator;
wherein identifying the active illuminator comprises:
(a) switching off one of the plurality of illuminators;
(b) searching for at least one blob in a subsequent image received from the image sensor, wherein at least one second criterion must be met for the or each blob, the at least one second criterion being different from the at least one first criterion;
(c) determining if the active blob is present in the subsequent image and, if the active blob is not present, determining that the active blob was a reflection from the illuminator that was switched off;
(d) on a condition that the active blob is present in the subsequent image, repeating steps (a) to (c) for other illuminators of the plurality of illuminators.

The fourth aspect may include any additional features recited in relation to the second aspect.

According to a fifth aspect, there is provided a computer-readable medium having stored thereon a computer program having instructions that when executed by a processor, cause the processor to perform a method of controlling illuminators in an eye tracking system, wherein the system includes a plurality of illuminators, the method comprising:

receiving a first image of the eye of the user from an image sensor, the first image resulting from the image sensor detecting light from the plurality of illuminators reflected from the eye of the user and reflected from an optic arrangement located between the plurality of illuminators and the eye of the user;

determining a pupil position of a representation of the eye in the first image;

searching for and identifying at least one blob in the first image, wherein the or each blob is a representation of a reflection from the optic arrangement of light from a respective illuminator of the plurality of illuminators, wherein at least one first criterion must be met for the or each blob;

selecting a blob of the at least one blob as an active blob;

identifying an active illuminator of the plurality of illuminators, wherein the active illuminator is the illuminator of the plurality of illuminators that is responsible for the active blob, and switching off the active illuminator;

wherein identifying the active illuminator comprises:
(a) switching off one of the plurality of illuminators;
(b) searching for at least one blob in a subsequent image received from the image sensor, wherein at least one second criterion must be met for the or each blob, the at least one second criterion being different from the at least one first criterion;
(c) determining if the active blob is present in the subsequent image and, if the active blob is not present, determining that the active blob was a reflection from the illuminator that was switched off;
(d) on a condition that the active blob is present in the subsequent image, repeating steps (a) to (c) for other illuminators of the plurality of illuminators.

The fifth aspect may include any additional features recited in relation to the second aspect.

BRIEF DESCRIPTION OF THE DRAWINGS

Specific embodiments will now be described in detail with reference to the accompanying drawings, in which:

FIG. 8 shows a representation of illuminators associated with a region of the image;

FIGS. 9a and 9b show a representation of an example image taken by an embodiment of an eye tracking system, whereby FIG. 9a is before illuminator control and FIG. 9b is after illuminator control.

DETAILED DESCRIPTION

Figure 1:
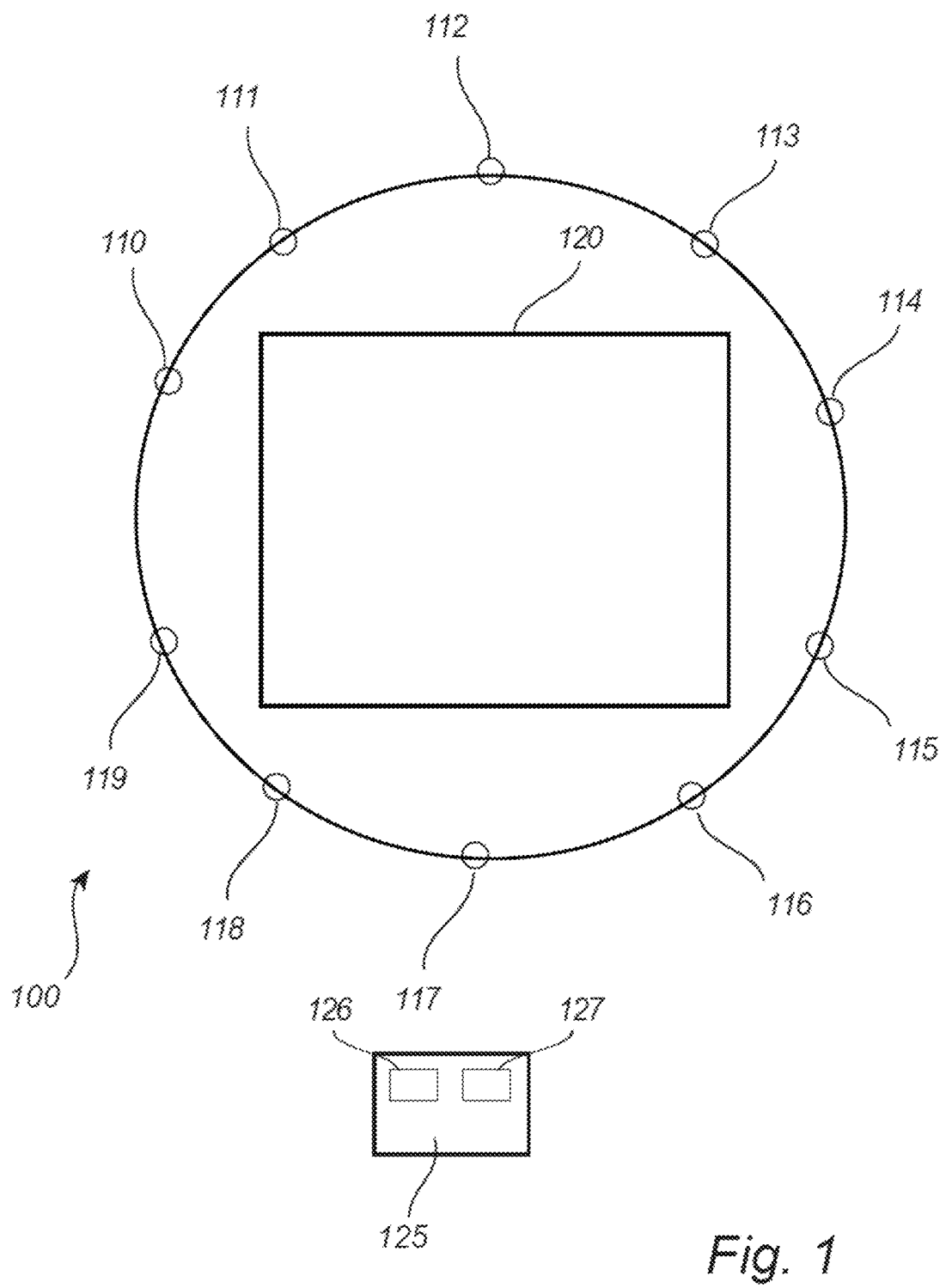
FIG. 1 shows a schematic view of an example eye tracking system.

FIG. 1 shows a simplified view of an eye tracking system 100 (which may also be referred to as a gaze tracking system) in a head mounted device (HMD) in the form of a virtual reality (VR) device or VR glasses. The system 100 comprises illuminators 110-119 for illuminating the eyes of a user, and an image sensor 120 for capturing images of the eyes of the user. The illuminators 110-119 may be, for example, light emitting diodes emitting light in the infrared (IR) frequency band, or in the near infrared (NIR) frequency band. The image sensor 120 may for example be an image sensor of any type, such as a complementary metal oxide semiconductor (CMOS) image sensor or a charged coupled device (CCD) image sensor. The image sensor 120 may consist of an integrated circuit containing an array of pixel sensors, each pixel containing a photodetector and an active amplifier. The image sensor 120 is capable of converting light into digital signals. In reality, as an example, it could be:

an infrared (IR) image sensor;
an RGB sensor;
an RGBW sensor; or
an RGB or RGBW sensor with IR filter The eye tracking system 100 also comprises circuitry 125, for example including a receiver 126 and processing circuitry 127, for receiving and processing the images captured by the image sensor 120. The circuitry 125 may for example be connected to the image sensor 120 and the illuminators 110-119 via a wired or a wireless connection and be co-located with the image sensor 120 and the illuminators 110-119 or located at a distance, for example in a different device. In another example, the circuitry 125 may be provided in one or more stacked layers below the light sensitive surface of the image sensor 120.

It is to be noted that the location of the image sensor 120 in FIG. 1 is only for illustrative purposes. The location of the image sensor for one eye in a VR device is generally away from the line of sight for the user in order not to obscure a VR display arranged in the VR device for that eye. This is, for example, enabled by means of so-called "hot mirrors" which reflect a portion of the light and allow the rest of the light to pass—e.g. infrared light is reflected and visible light is allowed to pass.

Figure 2:
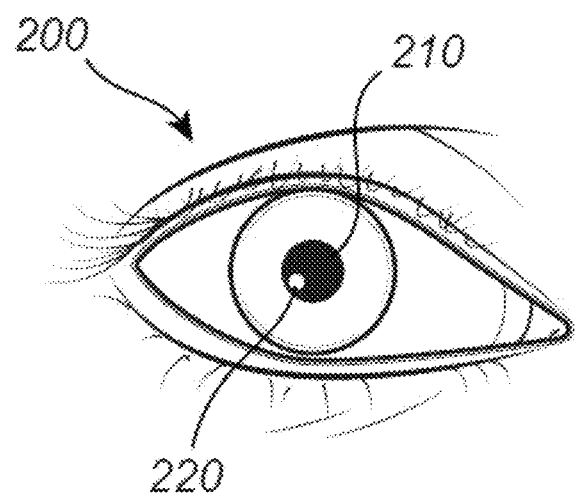
FIG. 2 shows an example image of an eye.

FIG. 2 shows an example of an image of an eye 200, captured by the image sensor 120 of FIG. 1. The circuitry 125 may, for example, employ image processing (such as digital image processing) for extracting features in the image. The circuitry 125 may, for example, employ pupil centre corneal reflection (PCCR) eye tracking to determine where the eye 200 is looking. In PCCR eye tracking, the position of the centre of the pupil 210 and the position of the centre of a glint 220 at the eye 200 are estimated in the circuitry 125. The glint 220 is caused by reflection of light from one of the illuminators 110-119. The circuitry 125 calculates where the user's eye is in space using the glint 220 and where the user's eye 200 is pointing using the pupil 210. Since there is typically an offset between the optical centre of the eye 200 and the fovea, the circuitry 125 performs calibration of the fovea offset to be able to determine where the user is looking. The gaze directions obtained from the left eye and from the right eye may then be combined to form a combined estimated gaze direction (or viewing direction).

In the eye tracking system described with reference to FIG. 1, the illuminators 110-119 are arranged in an eye tracking module along the periphery of a circle. This arrangement serves only as an example. It will be appreciated that more or less any number of illuminators and image sensors may be employed for eye tracking, and that such illuminators and image sensors may be distributed in different ways relative to displays watched by the user. It will be appreciated that the eye tracking scheme described in the present disclosure may for example be employed for wearable eye tracking (such as in virtual reality (VR) glasses).

Figure 3A:
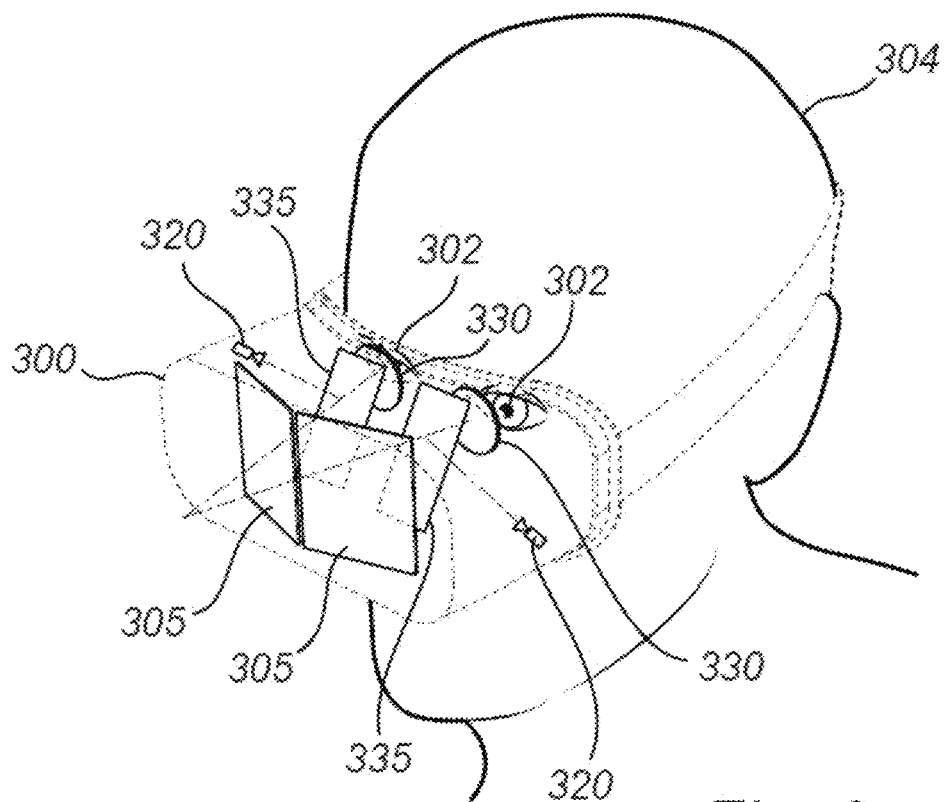
FIG. 3a shows a view of selected parts of a head mounted device (HMD)
Figure 3B:
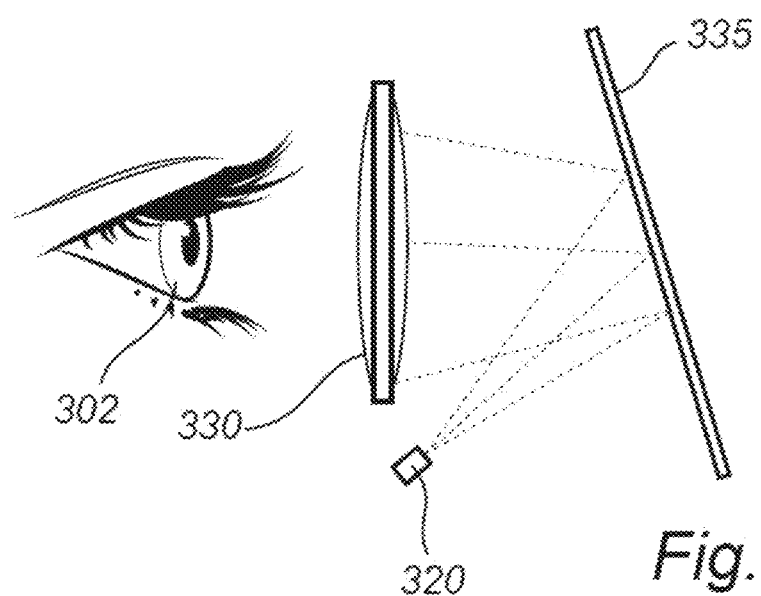
FIG. 3b shows a side view of selected parts of an HMD.
Figure 3C:
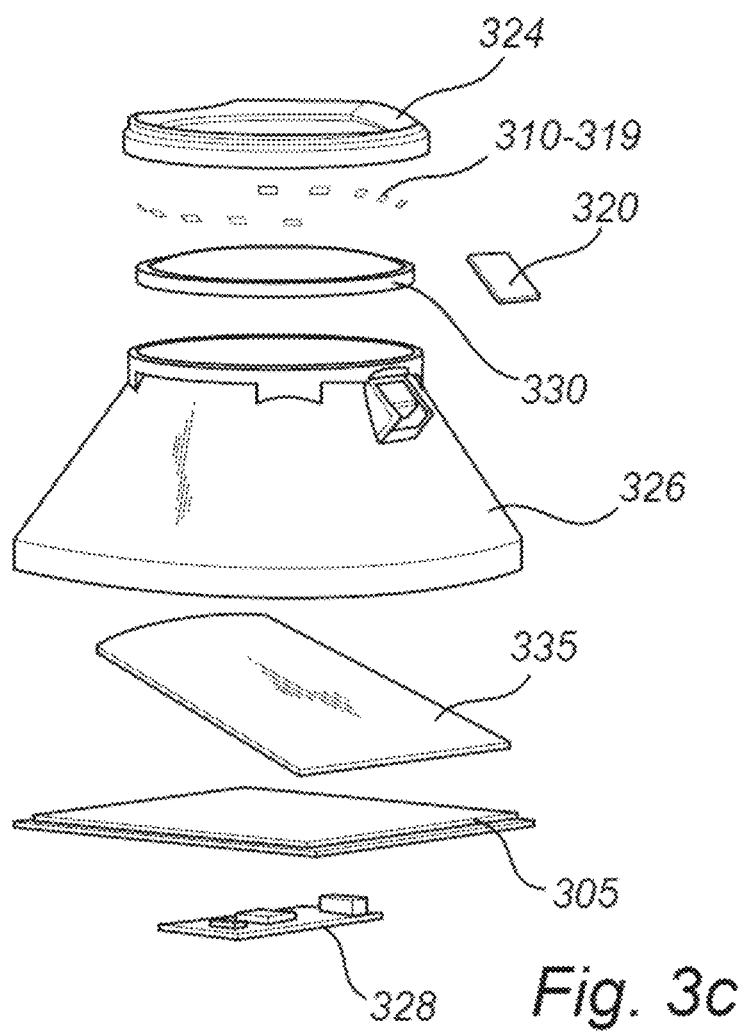
FIG. 3c shows an exploded view of selected parts of an HMD.

FIGS. 3a-c each show a separate view of selected parts of a head mounted device in the form of a virtual reality (VR) device (VR glasses) 300 including an eye tracking system in which embodiments may be implemented.

FIG. 3a shows a view of selected parts of a head mounted device in the form of the VR glasses 300 including an eye tracking system in which embodiments may be implemented. In addition to the VR glasses 300, eyes 302 and a head 304 of a user are shown. The VR portion of the VR glasses 300 shown comprises two VR displays 305 and two VR lenses 330, one VR display 305 and one VR lens 330 for each eye 302. The VR displays 305 are positioned in front of the eyes 302 and the VR lenses 330 are positioned between the eyes 302 and the VR displays 305. In alternative to two VR displays 305, two regions of a single VR display may be used. The eye tracking portion of the VR glasses 300 comprises two hot mirrors 335 and two cameras 320. In order to capture images of the eyes 302 for use in eye tracking, the hot mirrors 335 are arranged between the VR displays 305 and the VR lenses 330. Furthermore, illuminators (not shown) are arranged on or in the VR glasses 300 such that illumination rays are directed towards the eyes 302. Reflections from the eyes 302 of the illumination rays towards the hot mirrors 335 will reflect towards the cameras 320 in which the illumination rays are detected to produce an image of the eye. For example, the hot mirrors 335 may be of a type such that they will reflect light in the infrared frequency band but be transparent for light in the visible frequency band. The illuminators (not show) used would then produce illumination rays in the infrared frequency band and the cameras 320 will include image sensors able to detect light in the infrared frequency band.

FIG. 3b shows a side view of selected parts of the VR glasses 300. Illumination rays from the illuminators (not shown) towards the eye 302 will reflect back and pass through the VR lens 330 towards the hot mirror 335 and reflect towards the camera 320 in which the illumination rays are detected to produce an image of the eye.

FIG. 3c shows an exploded view of selected parts of the VR glasses 300. Selected parts for one eye are shown including an illuminator cover 324, illuminators in the form of light emitting diodes (LEDs) 310-319, the camera 320 including an image sensor, the VR lens 330, a lens cup or lens tube 326, the hot mirror 335, the VR display 305 and an electronics board 328. FIG. 3c shows an example arrangement of the illuminators in the form of LEDs 310-319, where the LEDs 310-319 are arranged along the periphery of the VR lens 330 to produce a pattern when illuminating the eye 302. The illumination rays from the LEDs 310-319 reflected from the eye and the hot mirror 335 is detected in the camera 320 to produce an image of the eye.

Head mounted devices, such as in VR glasses, can be enhanced by including wearable eye tracking using illuminators and one or more image sensors arranged in the head mounted device for determining eye direction and/or gaze direction based on estimation of a position of a centre of the pupil and a position of the centre of one or more glints at the eye from the illuminators. A problem that can arise in such devices is that when the user wears spectacles (glasses) under the VR glasses, light from the illuminators can be reflected by the glasses of the spectacles onto the image sensor. Areas of an image of the eye used for eye tracking corresponding to such reflections are called blobs herein. Such blobs may affect the possibility to identify a representation of the pupil in the image and/or glints such that it will be difficult or impossible to determine eye direction and/or gaze direction or at least not with desirable accuracy.

However, as each blob generally is caused by one illuminator, this illuminator may be identified and switched off. Hence, a new image may be captured by the image sensor in which the blob is no longer present.

Figure 4:
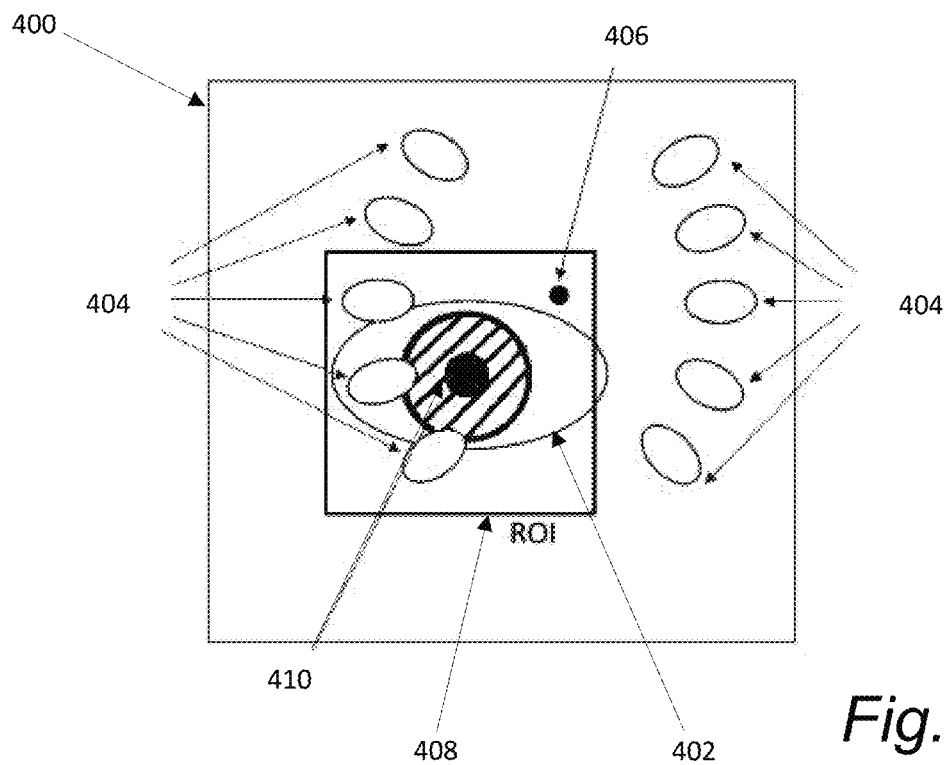
FIG. 4 shows a schematic view of an image captured by the eye tracking system of FIG. 1.

FIG. 4 is a schematic depiction of an image 400 generated by an eye tracking system such as that shown in FIG. 1. The image 400 includes an eye 402 of the user and ten blobs 404 generated by unwanted reflection of an optic assembly. Each blob 404 is associated with a respective illuminator of the eye tracking system. Glints associated with each illuminator may also be visible in the image 400, but these have been omitted from FIG. 4, for clarity. In many cases, glints are completely covered or obscured by blobs, although this may not always be the case.

A lens centre 406 is also indicated on the image 400, although this would not be physically visible on an actual image. The lens centre 406 corresponds to the centre of the lens of the eye tracking assembly. As the illuminators of the present embodiment are arranged around the outside of the lens, the lens centre 406 is also the positional centre of the illuminators, and therefore blobs 404. Whilst it may be preferable for the lens centre 406 to always be aligned with the centre of the eye 402 of the user, this is not always practical, for example due to the fit of the eye tracking system or a VR headset to which it is attached. As such, it can be seen that the eye 402 in this image 400 is off-centre compared to the positional centre of the illuminators.

In order to lower the computational load on the eye tracking system, the processor designates a region of interest (ROI) 408 about the eye of the user. The ROI 408 is the region within which the eye 402 is situated and that is therefore most applicable to the removal of blobs in the eye tracking system. By designating the ROI 408, the processor can concentrate resources on the blobs 404 that are in the vicinity of the eye 402 of the user, and not waste resources on the processing of less important features of the image 400. The processor therefore processes only the ROI 408 of the image 400 in order to determine the presence of blobs 404. For other processes carried out by the eye tracking system, such as the eye tracking itself, different regions of interest may be used, where each region of interest is the portion of the image that is most useful or applicable to the process being executed.

As mentioned previously, a blob 404 is an unwanted reflection generated by an optic assembly between the illuminators and the eye of the user, such as a pair of eyeglasses. In an image 400, a blob 404 therefore consists of several connected pixels representing this unwanted reflection. The processor determines the presence of blobs 404 by the application of one or more predetermined criteria.

For example, a blob 404 can be detected on the grounds that each of its pixels have an intensity over a predefined intensity threshold. This intensity threshold may be absolute or it may, as in the present embodiment, be a relative intensity threshold. For example, the intensity threshold for determining constituent pixels of a blob 404 may be relative to a maximum pixel intensity over the whole image 400 or over the ROI 408 of the image.

The predetermined criteria may also include a size criterion and/or mass criterion. The size criterion may be that the blob 404 should consist of a predefined number of connected components, i.e. pixels, where "connected component" is defined as a neighbouring pixel in the 8-pixels surrounding any other pixel. Blob mass is then defined as the sum of pixel intensities of all of the pixels belonging to the blob 404, i.e. the sum of the intensities of all of the connected components constituting the blob 404. As such, for each image frame of the present embodiment, a blob 404 is determined when the mass of any blob 404 is above a first threshold for blob mass. When determined, a blob 404 is added to a list of blobs detected in the image, this information being stored in processor memory (not shown). These detected blobs 404 may be termed "problematic blobs" as they have the potential to cause issues in the tracking of the eyes in the image. This determination step results in the three blobs 404 found in the ROI 408 of FIG. 4 being labelled as problematic blobs.

Blob mass is the preferred method for blob detection. However, other methods may also be available, and these will be known to the skilled person.

Figure 5:
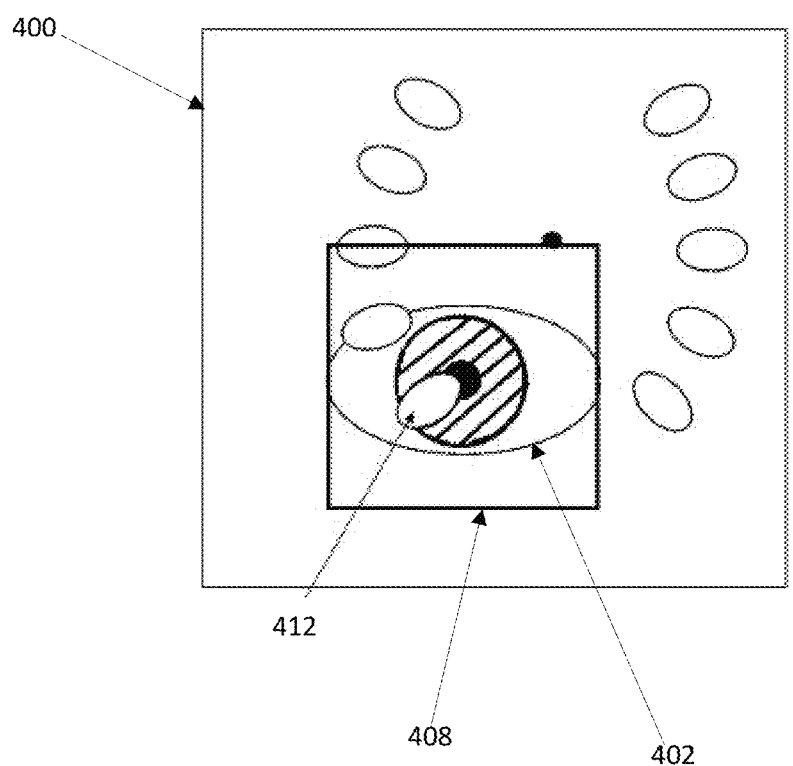
FIG. 5 shows a schematic view of a further image captured by the eye tracking system of FIG. 1, where an active blob is identified.

The next step is the determination of a blob 404 that is likely to cause issues with the tracking of the eye of the user. The processor therefore determines the blob 404 that is closest to the pupil 410 in the image 400. Such a blob 404 is highlighted in FIG. 5. The closest blob 404 to the pupil 410 is termed the "active blob" 412 and the next step is to determine how to remove this active blob 412 from the image 400.

For the sake of limiting the required processing power of the present method, it is desirable to limit the amount of information that is stored between frames of the image 400. However, it may be desirable for the processor to temporarily store the ROI 408 of the frame in order to evaluate the efficacy of blob removal once it has been executed. The ROI mask, i.e. the position of the ROI 408 relative to the image 400, may therefore be saved before and after the association of a specific blob to a specific illuminator—as will be discussed in the following paragraphs—in order to evaluate gaze accuracy before and after the illuminator was switched off. The ROI mask may be saved as a coordinate of an origin of the ROI and a size of the ROI, e.g. (x, y, [size]). This will limit the amount of information needing to be stored.

"Gaze accuracy" is a measure of how accurate the eye tracking performance is, based on an error—normally in degrees—of the direction of the predicted gaze from the direction of the true gaze direction. By saving the ROI mask, it is possible to check the difference in accuracy before and after blob removal.

Figure 6:
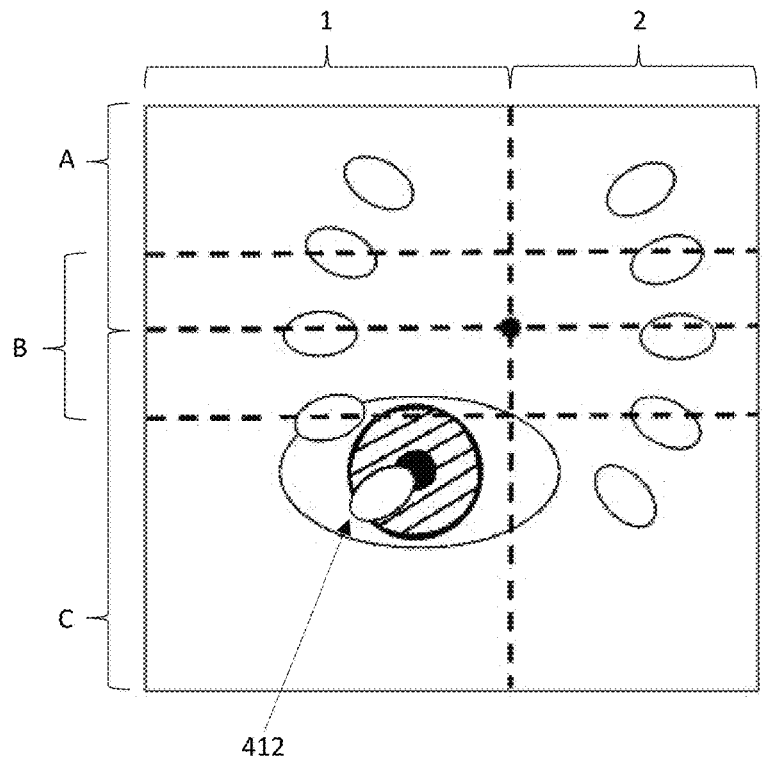
FIG. 6 shows a further schematic view of the image of FIG. 5, including a representation of the illuminator regions.

When an active blob 412 has been identified, the next stage is to search for the illuminator that is the cause of the active blob 412 being present in the image. In order to streamline the process, the image 400 is split into regions. In the described embodiment, the regions are aligned relative to the lens centre 406 of the system, i.e. the centre point between all of the illuminators of the system. This is depicted in FIG. 6. The position of the illuminators is known from the hardware specification, and therefore it can be determined where the illuminators should be in relation to the image. In one embodiment, the determination of what region to select can be based on the position of the active blob 412 in relation to the lens centre 406. The system then selects a region of the image 400 that includes the active blob 412 and identifies the illuminators associated with the region.

The number of regions and size of the regions may be asymmetrical, depending on the arrangement of the illuminators in the system. The regions may also overlap, as shown in FIG. 6, in order to ensure that each region includes all of the illuminators that may reasonably be the cause of the active blob. In FIG. 6, each region has been given a reference, for ease of explanation, based on its row—A, B, or C—and its colum—1, or 2. As can be seen, each of the regions overlaps with at least one other region, in order that each region includes a total of three of the ten illuminators. For example, region A1, the upper-left region, overlaps to the bottom with region B1. Region C1, the lower-left region, overlaps to the top with region B1. Therefore, B1 is made up of the lowermost part of region A1 and the uppermost part of region C1. In this way, the regions are split so that each illuminator, apart from the uppermost and lowermost illuminator on the left side, are part of at least two regions. The central illuminator on the left side is a part of all three left-sided regions. In the present embodiment, the right-sided regions are arranged in the same way as the left-sided regions, sharing the same relative relationships. Although the present embodiment has no overlap between regions on the left and right, this may be desirable and there is no intention to limit the system to such an arrangement; the present arrangement is designed to fit the shown arrangement of illuminators.

In the present embodiment, the illuminators are arranged on the inner side and outer side of the eye, with a horizontal gap in-between, i.e. illuminators are not positioned on a top or bottom side of the eye. As such, vertical overlap of the regions is much more important than horizontal overlap of the regions, as it is extremely unlikely, if not impossible, for an illuminator on one side of the eye to produce a blob on the other side of the eye. Conversely, the illuminators are close together vertically, and therefore their resultant blobs may easily be mixed up.

The number of illuminators in each region may be chosen based on the total number of illuminators and their position and may be more or less than three. In the present embodiment, three illuminators per region is chosen to give a good balance of number of regions, and number of illuminators present in each region. An advantage of including multiple illuminators in each region is that it provides vertical and/or horizontal tolerance for slippage of the system during use—for example, an HMD may slip on the user's face in use. By ensuring each region can be responsible for the control of multiple illuminators, even if the system moves relative to the face of the user, it can be ensured that the illuminator responsible for the blob in any region is capable of being removed by the control of that region's associated illuminators. Association between a region and its illuminators in the present embodiment is based on the geometry of the system, given a specific illuminator mount position. Other numbers of illuminators may be included in each region, but it has been found, in the present embodiment, that three illuminators per region provides a good compromise between speed of detection and ensuring that the correct illuminator is found.

A total of six regions are shown in FIG. 6. The regions have been chosen to have an equal number of illuminators and are of different sizes. The size difference between regions is, in the present embodiment, due to the non-alignment of the centre of the lens with the centre of the image. This is simply a by-product of ensuring that each region includes the same number of illuminators and may or may not be the case in other arrangements of the system.

In the described embodiment, the regions are predetermined based on the illuminator arrangement and camera position. As such, the processor need not determine the regions every time an image is processed, but can instead refer to the regions when searching for the illuminator responsible for the active blob. In other embodiments, the regions may be determined during processing of the initial image, for example, or in any other way, the options for which will be known to the skilled person.

Figure 7:
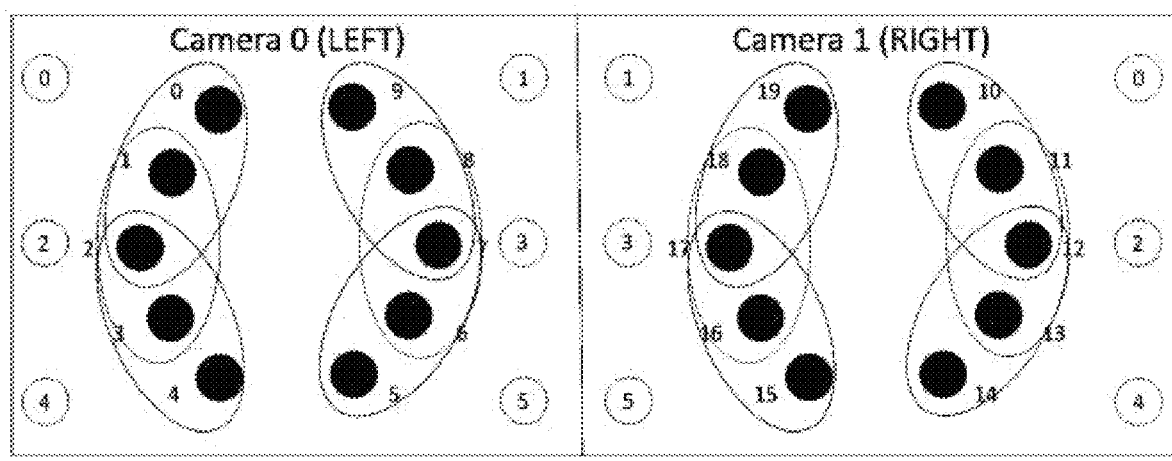
FIG. 7 shows a further representation of illuminator regions and the illuminators associated with each region.

The illuminators associated with each region is depicted in another way in the part labelled "Camera 0 (LEFT)" of FIG. 7. Where FIG. 6 shows a left eye of the user, region A1 of FIG. 6 corresponds to region 0 of FIG. 7 and includes illuminators 0, 1, and 2. Region B1 of FIG. 6 corresponds to region 2 of FIG. 7 and includes illuminators 1, 2, and 3. Region C1 of FIG. 6 corresponds to region 4 of FIG. 7 and includes illuminators 2, 3, and 4. Region A2 of FIG. 6 corresponds to region 1 of FIG. 7 and includes illuminators 9, 8, and 7. Region B2 of FIG. 6 corresponds to region 3 of FIG. 7 and includes illuminators 8, 7, and 6. Region C2 of FIG. 6 corresponds to region 5 of FIG. 7 and includes illuminators 7, 6, and 5. Similar associations are made for the RIGHT side camera also shown in FIG. 7 in relation to an image of the right eye of the user.

Once the region containing the active blob 412 has been identified, the processor acts to turn off the illuminators in turn in order to identify which illuminator is responsible for the active blob 412. FIG. 8 shows the same image 400 as FIG. 6, but with the region C1 identified as containing the active blob highlighted. The illuminators controlled when this region has been identified are also highlighted.

A first illuminator is switched off in accordance with which region has been selected as being responsible for the active blob 412. The first illuminator to be switched off is generally the central illuminator of the region C1 but may be any other illuminator in the region C1. Once this first illuminator has been switched off, the image sensor takes another image 400 in order to see if a blob 404 that is in the vicinity of the active blob 412 of the first image 400 is present in this subsequent image 400.

If a blob 404 is not found to be present in the vicinity of the active blob 412, then it can be determined that the illuminator that has been switched off is that which was responsible for the generation of the active blob 412. The system will ensure that this illuminator remains off until such a time as the pupil 410 of the user moves away from the area that contained the active blob 412. In the present system, the original position of the pupil is saved. The current pupil position at any point can then be compared to the original position. If the distance is bigger than a threshold then it is determined that the pupil 410 has moved far enough away such that the illuminator can be switched back on. Other methods of performing this task will be known to the skilled person and will not be discussed further in the present application.

If a blob 404 is found to be present in the vicinity of the active blob 412, then it can be determined that the illuminator that has been switched off is not that which was responsible for the generation of the active blob 412. At this point, the process of switching off an illuminator and determining whether the active blob 412 is present in a subsequent image 400 is executed for a second illuminator in the region C1. This process can be repeated for all of the illuminators in the region C1, if necessary. Once the correct illuminator has been identified, however, the process of switching off other illuminators can cease until such a time as the pupil 410 of the user approaches another detected blob 404.

If all illuminators within the identified region C1 have been tested, and no blob-illuminator association has been identified, all of the illuminators are switched back on. From this point, the method can be repeated from stage of the identification of the region, as long as the active blob 412 remains in the vicinity of the pupil 410 of the user.

FIGS. 9a and 9b show the effect of the present system on blobs detected in the image. FIG. 9a shows clearly a number of blobs 904 present in the image 900a taken by the system, one of which—circled—is identified as an active blob 912 due to its proximity to the pupil 910 of the user. After execution of the method described above, the active blob 912 has been removed from FIG. 9b, a subsequent image 900b. It will be apparent that a glint 914 from the associated illuminator has also been removed, due to the switching off of the illuminator responsible for the active blob 912. However, this is desirable in view of the fact that the pupil 910 is no longer obscured by the active blob 912, and the remaining glints are still available for use during the eye tracking process. In typical eye tracking systems, the number of glints required to determine gaze is significantly lower than the total number of glints provided by the illuminators, for example two glints are required from a total of ten illuminators. However, by switching off only a limited number of illuminators, such as the one that is switched off in the present embodiment, it can be ensured that enough glints remain to enable eye tracking.

It may be noted that the thresholds determining the presence of blobs in the image may not be the same prior to and after the switching off of an illuminator. This is due to the fact that each illuminator not only has the ability to produce a glint and a blob, but also contributes to the total illumination of the eye in the image. Thus, where ten illuminators are illuminating the eye, the total illumination provided to the eye will be greater than when nine or fewer illuminators are illuminating the eye. Although discussed in relation to ten illuminators as shown in the present Figures, the total number of illuminators is immaterial, and it is the change in illumination provided before and after switch-off of an illuminator that is important.

If using the same threshold for blob detection before and after illuminator switch-off a blob may fail to be detected even if it is still present. This is because the intensity of each pixel, and therefore the mass of the blob—as defined earlier—may decrease due to lower overall illumination, taking it below the threshold by which a blob is identified, whilst the blob itself still remains in the image. If the processing of the image results in a blob failing to be detected correctly, the wrong illuminator may be associated with the blob, leaving the illuminator responsible for the blob illuminated and doing nothing to assist with the eye tracking function of the eye tracking system.

To avoid such a situation, the present embodiment utilises a different threshold to identify blobs after an illuminator has been switched off. This second threshold—in the present embodiment utilising the mass of the blob, although it could refer to other characteristics such as the intensity or size of the blob—is therefore set to be lower than the first threshold.

This ensures that, if the mass of the blob when first detected is close to the first threshold, it does not drop below the second threshold simply due to the lowering of overall illumination. The effect is more stable blob detection.

As mentioned above, it may be preferable to include each of the first and second thresholds as relative thresholds that are reactive to characteristics of the image in order to ensure optimum blob detection. In the present embodiment, each of the first and second thresholds are determined with respect to the maximum pixel intensity in the image. This allows the algorithm operated by the processor to handle images taken in a way that dynamically adjusts the illumination in the system to facilitate optimal collection of eye images. For example, the system may utilise adjustments to camera dynamic exposure, camera dynamic gain, dynamic image gamma, and/or dynamic LED current or power. This is not an exhaustive list and the skilled person will be aware of other changes in the image collection of the system that may be accounted for by the relative thresholds.

Without relative thresholds, there can be issues with response to dynamic illumination. For example, if one image has a maximum intensity value of 50 and a second image has a maximum intensity value of 80, if the threshold for blob detection is set at 60 then no blobs will be found in the first image and a lot may be found in the second image. However, the illuminators will be likely to be still obscuring the pupil in the same way. Comparatively, if a relative threshold is set of 90% of the maximum intensity value in the image, then the brightest 10% of pixels will always be selected, independent of actual intensity.

The actual values of the first and second thresholds may be determined with respect to the eye tracking system to which they are applied. As an example, the first threshold may be 90% of the maximum pixel intensity, and the second threshold may be 85% of the maximum pixel intensity.

Though in the present embodiment the thresholds are determined with reference to the maximum pixel intensity, it is also possible to determine the thresholds from other measures, such as the average pixel intensity.

It will be apparent that the present method and system can operate with lower computing power than known systems due to the fact that it is not necessary to store a large amount of information between frames of the image, as the processing does not require much knowledge of the previous state of the system. The only information that requires storing between frame of the image is:
- the location of the active blob;
- the illuminators within the identified region that have already been tested; and
- a variable indicative of whether a blob-to-illuminator association has been determined.

The low amount of information required to be stored by the described system means that the present system is computationally lighter than known tracking approaches as described in the prior art. Region-based toggling of illuminators requires less information to determine the same association as is provided when blobs and pupils are tracked between frames.

It is foreseeable that an illuminator may be wrongly associated with an active blob in the image, resulting in a "wrong state". A "wrong state" can be defined as when an illuminator is held "off" whilst the active blob remains visible in the image. Such events can occur, for example, if a headset incorporating the eye tracking system slips out of position or is removed by the user, or if the image sensor returns a blank image. To avoid the system continuing to operate in such a state, the present system includes a reset function. By "reset" it is meant that the system will turn on all illuminators and continue the blob removal process as if no illuminators in the identified region have been checked. The system may therefore be configured to reset any time:
- the pupil is not detected in an image;
- no blobs are detected in an image;
- if a blob close to the active blob is found, e.g. when a blob is not detected for a few frames when toggling illuminators and the algorithm associates the wrong illuminator with the active blob (this can occur when the blob falls below the threshold mass for detection under certain illumination conditions, but then dynamic adjustments result in the blob being detected at a later time, at or close to the position at which is was originally found);
- if a blob closer to the pupil than the active blob is found (a predetermined margin may be defined in the system for determining when a blob is considered to be close enough to the pupil to trigger a reset); and/or
- the HMD or eye tracking system is removed by the user.

In some embodiments, the system may be designed to account for system latency by waiting a number of frames before making any associated decisions or making any hardware changes, e.g. changing the illumination settings. By waiting a number of frames to take into account this latency, it can be ensured that the previous decisions and/or changes have been implemented by the system before any subsequent decisions and/or changes are made.

System latency may be a predetermined number of frames dependent on the system, where the predetermined number of frames is a specific number of frames greater than or equal to 0. Alternatively, the system may detect latency on an ongoing basis in order to then use this detected latency when implementing subsequent decisions and/or changes.

Thus far, the system has been described in relation to a single eye of a user. Of course, where a system includes illuminators and cameras for both eyes of a user, the control of the system may be implemented using two state machines that operate independently for each eye, or in any other way, the possibilities of which will be known to the skilled person.

Figure 10:
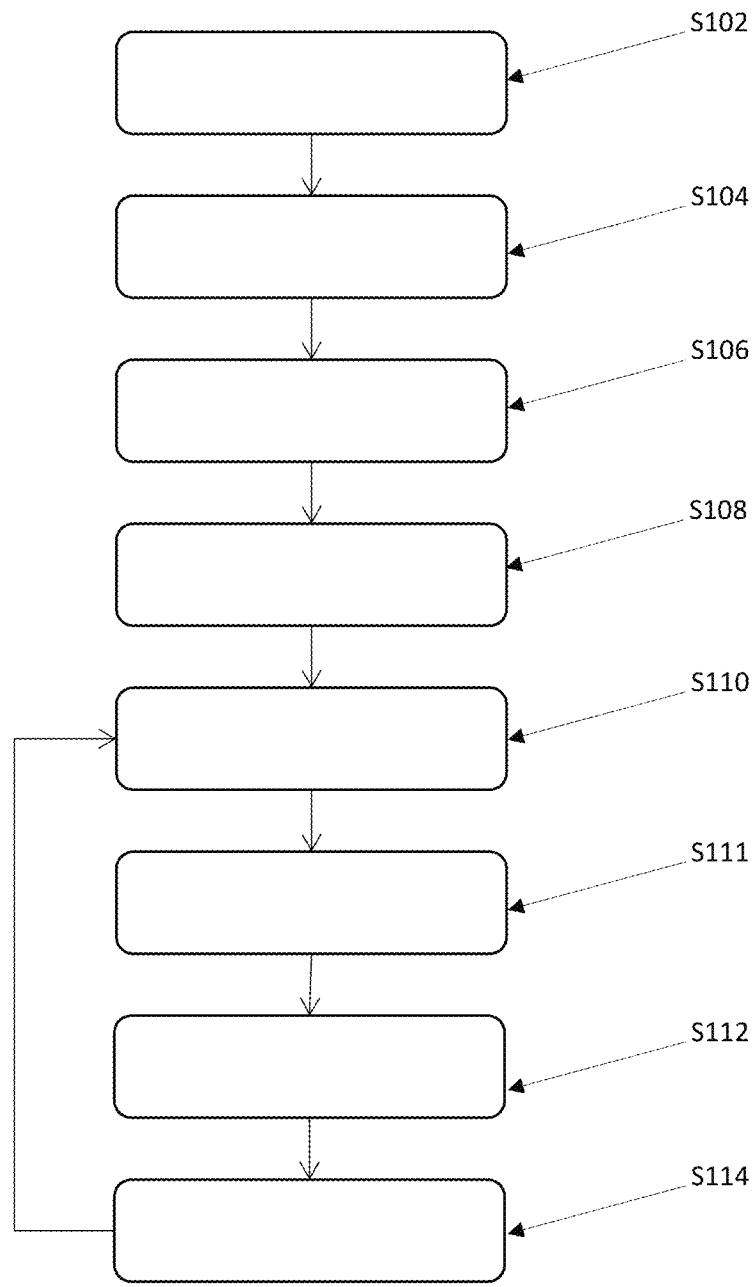
FIG. 10 shows a flow chart of the method of the second aspect.

The method as described thus far is depicted simply in a flow chart in FIG. 10. In a first step, an image of the eye of the user is received S102 from the image sensor. A pupil position of a representation of the eye in the image that has been received is then determined S104 from the image. One or more blobs can then be searched for and identified S106 in the image by the use of at least one first criterion and an active blob can be selected S108. The search for blobs may be carried out in a region of interest surrounding the pupil of the eye. The active blob is generally the one considered to be most problematic to the eye tracking system, such as that which is closest to the pupil.

Following the above, it is required to identify which illuminator is responsible for the active blob, and this illuminator can be switched off. The identification of this active illuminator is achieved by switching off S110 one of the plurality of illuminators. The illuminator to be switched off may be selected S111 from a subset of illuminators contained within a region that incorporates the active blob.

A subsequent image is then received from the image sensor and blobs are searched for S112 by the use of at least one second criterion that is different from the at least one first criterion. It can then be determined S114 whether the active blob is present in the subsequent image and, if the active blob is not present, it can be determined that the active blob was a reflection from the illuminator that was switched off. If, on the other hand, the active blob remains present in the subsequent image, the preceding steps S110-S114 can be repeated for other illuminators of the plurality of illuminators.

It should be noted that the eye tracking system and method described in the present application is not limited to use with the head mounted device of FIGS. 3a to 3c. In fact, the eye tracking system and method are equally applicable to other types of device including, but not necessarily limited to head mounted devices such as VR glasses. The eye tracking system may be used with any system that incorporates eye tracking using a plurality of illuminators and an image sensor, and is not dependent on other aspects of a larger device. Non-limiting examples of other devices with which the present eye tracking system may be used include extended reality (XR) headsets, including those for augmented reality (AR), virtual reality (VR), and mixed reality (MR), and eye tracking wearables, such as the Tobii Pro Glasses 3 developed by the applicant. Other devices in which the described eye tracking system and method may be implemented will be known to the skilled person in the context of the present disclosure.

The invention claimed is:

1. An eye tracking system comprising:
   a plurality of illuminators for illuminating an eye of a user;
   a receiver for receiving a first image of the eye of the user from an image sensor, the first image resulting from the image sensor detecting light from the plurality of illuminators reflected from the eye of the user and reflected from an optic arrangement located between the plurality of illuminators and the eye of the user; and
   processing circuitry configured to carry out the steps of:
      determining a pupil position of a representation of the eye in the first image;
      searching for and identifying at least one blob in the first image, wherein the or each blob is a representation of a reflection from the optic arrangement of light from a respective illuminator of the plurality of illuminators, wherein at least one first criterion must be met for the or each blob;
      selecting the closest blob to the pupil of the at least one blob as an active blob;
      identifying an active illuminator of the plurality of illuminators, wherein the active illuminator is the illuminator of the plurality of illuminators that is responsible for the active blob, and switching off the active illuminator;
   wherein identifying the active illuminator comprises:
   (a) switching off one of the plurality of illuminators;
   (b) searching for at least one blob in a subsequent image received from the image sensor, wherein at least one second criterion must be met for the or each blob, the at least one second criterion being different from the at least one first criterion, wherein the at least one first criterion includes a blob mass higher than a first predetermined threshold and the at least one second criterion includes a blob mass higher than a second predetermined threshold that is lower than the first predetermined threshold;
   (c) determining if the active blob is present in the subsequent image and, if the active blob is not present, determining that the active blob was a reflection from the illuminator that was switched off;
   (d) on a condition that the active blob is present in the subsequent image, repeating steps (a) to (c) for other illuminators of the plurality of illuminators.

2. The eye tracking system of claim 1, wherein, after selecting a blob as the active blob, the processing circuitry is further configured to carry out the steps of:
   identifying a region of a plurality of regions that contains the active blob, wherein each region is associated with a subset of the plurality of illuminators; and
   wherein steps (a) to (c) are executed on illuminators in the subset of illuminators associated with the identified region.

3. The eye tracking system of claim 1, wherein the step of identifying the active illuminator is executed from a subset of the plurality of illuminators.

4. The eye tracking system of claim 1, wherein the processing circuitry is further configured to determine a region of interest around the pupil position, wherein the step of searching for the at least one blob is executed in the region of interest.

5. The eye tracking system of claim 1, wherein the at least one first criterion and the at least one second criterion are dependent on the maximum pixel intensity of the image.

6. The eye tracking system of claim 1, wherein the first predetermined threshold and second predetermined threshold are relative to a maximum pixel intensity of the image or a portion of the image.

7. The eye tracking system of claim 1, wherein the processing circuitry is further configured to carry out of the step of:
   detecting when the pupil has subsequently moved away from the position of the active blob and switching back on the switched off illuminator.

8. The eye tracking system of claim 1, wherein the processing circuitry is further configured to turn on all illuminators and reset which illuminators in a region (A1-C2) have been checked if one or more of the following events occurs:
   the pupil is not detected in the image;
   no blobs are detected in the image;
   an additional blob within a first predetermined distance to the active blob is found in a subsequent image, indicating that an incorrect correlation between an illuminator and the active blob has been made;
   an additional blob within a second predetermined distance to the pupil is found, the additional blob being closer to the pupil than the active blob; or
   the eye tracking system is removed from the head of the user.

9. A head mounted device comprising an eye tracking system according to claim 1.

10. A method of controlling illuminators in an eye tracking system, wherein the system includes a plurality of illuminators, the method comprising:
   receiving a first image of the eye of the user from an image sensor, the first image resulting from the image sensor detecting light from the plurality of illuminators reflected from the eye of the user and reflected from an optic arrangement located between the plurality of illuminators and the eye of the user;
   determining a pupil position of a representation of the eye in the first image;
   searching for and identifying at least one blob in the first image, wherein the or each blob is a representation of a reflection from the optic arrangement of light from a respective illuminator of the plurality of illuminators, wherein at least one first criterion must be met for the or each blob;
   selecting the closest blob to the pupil of the at least one blob as an active blob;

identifying an active illuminator of the plurality of illuminators, wherein the active illuminator is the illuminator of the plurality of illuminators that is responsible for the active blob, and switching off the active illuminator;

wherein identifying the active illuminator comprises:

(a) switching off one of the plurality of illuminators;

(b) searching for at least one blob in a subsequent image received from the image sensor, wherein at least one second criterion must be met for the or each blob, the at least one second criterion being different from the at least one first criterion, wherein the at least one first criterion includes a blob mass higher than a first predetermined threshold and the at least one second criterion includes a blob mass higher than a second predetermined threshold that is lower than the first predetermined threshold;

(c) determining if the active blob is present in the subsequent image and, if the active blob is not present, determining that the active blob was a reflection from the illuminator that was switched off;

(d) on a condition that the active blob is present in the subsequent image, repeating steps (a) to (c) for other illuminators of the plurality of illuminators.

11. The method of claim 10, further comprising the steps of, after selecting a blob as the active blob:

identifying a region of a plurality of regions that contains the active blob, wherein each region is associated with a subset of the plurality of illuminators; and wherein steps (a) to (c) are executed on illuminators in the subset of illuminators associated with the identified region.

12. The method of claim 10, further comprising the step of determining a region of interest around the pupil position, wherein the step of searching for at least one blob is executed in the region of interest.

13. The method of any of claim 10, wherein the at least one first criterion and the at least one second criterion are dependent on the maximum pixel intensity of the image.

14. The method of any of claim 10, wherein the first predetermined threshold and second predetermined threshold are relative to a maximum pixel intensity of the image or a portion of the image.

15. The method of claim 10, further comprising the step of:

detecting when the pupil has subsequently moved away from the position of the active blob and switching back on the switched off illuminator.

16. The method of claim 10, further comprising the step of turning on all illuminators and resetting which illuminators in a region have been checked if one or more of the following events occurs:

the pupil is not detected in the image;

no blobs are detected in the image;

a blob within a first predetermined distance to the active blob is found in a subsequent image;

a blob within a second predetermined distance to the pupil is found; or the eye tracking system is removed from the head of the user.

17. A non-transitory computer-readable medium having instructions that when executed by a processor, cause the processor to perform a method of controlling illuminators in an eye tracking system, wherein the system includes a plurality of illuminators, the method comprising:

receiving a first image of the eye of the user from an image sensor, the first image resulting from the image sensor detecting light from the plurality of illuminators reflected from the eye of the user and reflected from an optic arrangement located between the plurality of illuminators and the eye of the user;

determining a pupil position of a representation of the eye in the first image;

searching for and identifying at least one blob in the first image, wherein the or each blob is a representation of a reflection from the optic arrangement of light from a respective illuminator of the plurality of illuminators, wherein at least one first criterion must be met for the or each blob;

selecting the closest blob to the pupil of the at least one blob as an active blob;

identifying an active illuminator of the plurality of illuminators, wherein the active illuminator is the illuminator of the plurality of illuminators that is responsible for the active blob, and switching off the active illuminator;

wherein identifying the active illuminator comprises:

(a) switching off one of the plurality of illuminators;

(b) searching for at least one blob in a subsequent image received from the image sensor, wherein at least one second criterion must be met for the or each blob, the at least one second criterion being different from the at least one first criterion, wherein the at least one first criterion includes a blob mass higher than a first predetermined threshold and the at least one second criterion includes a blob mass higher than a second predetermined threshold that is lower than the first predetermined threshold;

(c) determining if the active blob is present in the subsequent image and, if the active blob is not present, determining that the active blob was a reflection from the illuminator that was switched off;

(d) on a condition that the active blob is present in the subsequent image, repeating steps (a) to (c) for other illuminators of the plurality of illuminators.

* * * * *